INVENTORS
GUNTHER C. M. E. WOLFRUM
JACOBUS J. RONGEN
ALFONS M. R. VAN IERSEL
PETRUS M. A. W. MOORS

BY Frank R. Trifari
AGENT

*INVENTORS*
GUNTHER C.M.E. WOLFRUM
JACOBUS J. RONGEN
ALFONS M.R. VAN IERSEL
PETRUS M.A.W. MOORS

BY
AGENT

United States Patent Office 3,373,323
Patented Mar. 12, 1968

3,373,323
PLANAR SEMICONDUCTOR DEVICE WITH AN INCORPORATED SHIELD MEMBER REDUCING FEEDBACK CAPACITANCE
Gunther Carl Maximilian Eduard Wolfrum, Jacobus Johannes Rongen, Alfons Matthijs Reinier van Iersel, and Petrus Martinus Albertus Wilhelmus Moors, Nijmegen, Netherlands, assignors to North American Philips Company, Inc., New York, N.Y., a corporation of Delaware
Continuation of applications Ser. No. 455,078, May 12, 1965, and Ser. No. 488,078, Sept. 17, 1965. This application Aug. 17, 1966, Ser. No. 572,938.
Claims priority, application Netherlands, May 15, 1964, 64—5,411; July 23, 1965, 65—9,551; Aug. 6, 1965, 65—10,237
15 Claims. (Cl. 317—235)

ABSTRACT OF THE DISCLOSURE

A planar semiconductor device incorporating an integrated shield underneath the contact pad for one of the semiconductor zones. A principal embodiment is a planar transistor in which the shield is a surface zone underneath the contact pad for the emitter or base zone. By connecting the shield to a point of potential, preferably the same point of constant potential as the other electrode of the emitter and base, the feedback capacitance of the transistor is substantially reduced enabling operation at much higher frequencies.

---

This application is a continuation of and combines two prior copending applications, Ser. Nos. 455,078 and 488,078, filed, respectively, on May 12 and Sept. 17, 1965 (now abandoned).

This invention relates to a semiconductor device of the so-called planar type. Such devices comprise a semiconductive body having a plurality of zones with adjacent zones having different electrical properties, for example, opposite conductivity types, and with at least one zone electrically connected to a metal layer intended for contact purposes, known as a contact pad or tab, which lies on an insulating layer covering the semiconductive body. Such devices include diodes and transistors.

A planar transistor generally comprises a wafer-shaped semiconductive body having a surface covered with an insulating layer such as a silicon oxide layer. Emitter, base, and collector zones in the form of nested zones of increasing surface area forming dish-shaped junctions extending to the surface are provided in the semiconductive body underneath the oxide. See U.S.P.'s 3,025,589 and 2,981,877 for a more complete description of such devices. Electrical connections to the emitter and base zones and sometimes to the collector zone are established through apertures or holes provided in the oxide layer. For high-frequency transistors, it is important that the capacitance between the various zones be as small as possible. The base and emitter zones are therefore given very small surface areas and thus the apertures in the oxide layer for establishing electrical connections to these zones must also be very small. In fact, these apertures are often too small for securing, for example, a connecting or lead-in wire directly to the relevant zone. Sometimes the shape of the relevant zone makes it difficult to connect the lead-in wire directly to the zone. Consequently, the oxide layer is covered with a metal layer known as a contact or bonding pad often having a larger surface area than the aperture in the oxide layer with a projecting portion of the metal layer extending through the aperture in the oxide layer into electrical contact with the relevant zone, for example, by alloying. It is now readily possible to secure the connecting conductor to this larger contact pad. Because of the small dimensions of the base and emitter zones, their contact pads or metallizations usually lie for the most part above the collector zone.

The present invention is based, among other things, upon the recognition that the above results in an increase in the base-collector capacitance and/or the emitter-collector capacitance which is undesirable in many circuits but which capacitance can be replaced in a simple manner by capacitances which are much less harmful. Such unwanted capacitance between a metal layer intended for contact purposes and the semiconductor body may also occur in semiconductor devices other than transistors, for example, in planar diodes, controlled rectifiers, or more complex assemblies.

One object of the invention is to provide a semiconductor device of the above-described kind in which the unwanted capacitance is decreased.

Another object of the invention is a transistor with low feedback interelectrode capacitance.

Still a further object of the invention is a planar transistor adapted for operation at high frequencies in a common-emitter or common-base circuit, provided with a construction which substantially eliminates the major source of feedback capacitance thereby increasing the operating frequency of the circuit for the same gain, or increasing the gain at the same operating frequency.

Still another object of the invention is an improved planar transistor which is readily manufactured at low cost.

According to the invention, a conductive shielding layer is incorporated in the device between the semiconductive body and the portion of the insulating layer covered by a contact pad for one of the active transistor zones, and a blocking or barrier layer is provided between the shielding layer and the semiconductive body. The shield may simply be a metal layer on an insulating layer, such as silicon oxide, serving as the blocking layer. Preferably, the shield is a diffused region in the semiconductive body which forms with the body a p-n junction as a blocking layer. The shield has an exposed portion for contacting. By applying a suitable potential to the shield in an operating amplifying circuit, the unwanted capacitance is reduced. In a preferred transistor embodiment of the invention, the shield is internally connected to the emitter electrode for a device intended for operation in the common-emitter mode and thus operates at emitter potential, whereas for the common base mode, the shield is internally connected to the base electrode and thus operates at base potential.

A further preferred transistor embodiment of the invention combines a surface diffused region of the semiconductor as the shield layer internally connected by a conductive deposit on the insulating oxide to the emitter pad or the base pad. The surface diffused shield region is made in a manner similar to that of the base diffused region thus requiring only a minor change in the normal processing of these devices. Yet devices made in accordance with the invention offer a threefold or more reduction in feedback capacitance compared with similar transistors made without the internal shield construction. Thus, the possible amplification is increased by a factor of about three or more, a remarkable advance considering the minor additional steps and cost required to achieve it.

The invention will now be described in detail in connection with several embodiments thereof, reference being had to the accompanying drawing wherein.

Figure 1:
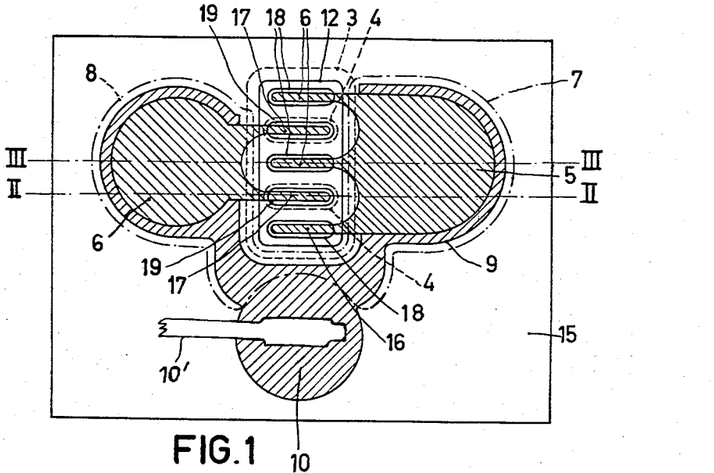
FIGS. 1, 2 and 3 are a plan view, a cross-sectional view along the line II—II, and a cross-sectional view along the line III—III, respectively, of one form of a transistor according to the invention using a metallic shield available externally for contacting.
Figure 2:
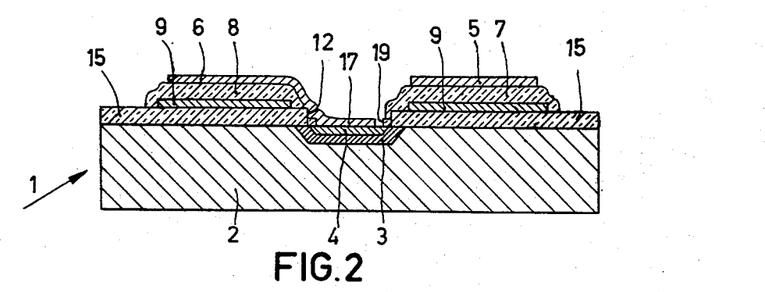
Figure 3:
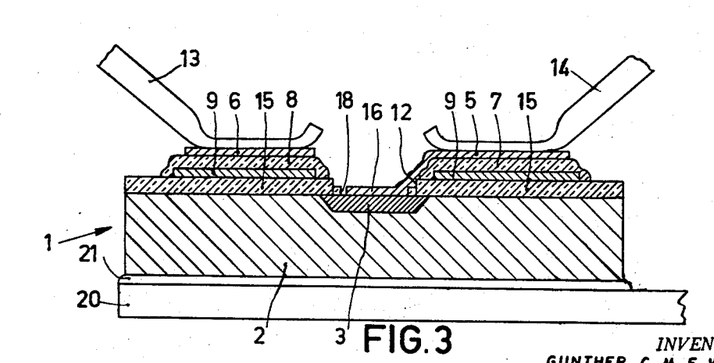

The embodiment shown in FIGS. 1, 2 and 3 relates to a semiconductor device comprising a semiconductive body 1 having a plurality of active zones 2, 3 and 4 with adjacent zones having different electrical properties, in this example opposite conductivity types. The zones 3 and 4 are electrically connected to metal layers or contact pads 5 and 6, respectively, which are intended for contact purposes and located on insulating layers 7 and 8, respectively, present between the metal pads 5 and 6 and the semiconductive body 1. According to the invention, the portions of the insulating layers 7 and 8 covered by the contact pads 5 and 6 lie substantially on a conductive shielding layer 9 having an exposed edge portion or pad 10 for contact purposes. A blocking layer 15 is present between the shield 9 and the underlying portion of the semiconductive body 1. In this example, the shield 9 is a metallization and the blocking layer 15 is an insulating silicon oxide layer provided on the silicon semiconductor body 1.

While separate shielding layers may be provided for the contact pads 5 and 6 and connected to the zones 3 and 4, respectively, as in the present example it is preferred to use a common shielding layer 9 for the contact pads 5 and 6. The insulating layers 7 and 8 are likewise formed as a single insulating layer 7, 8 as may be seen from FIG. 1. For the sake of clarity, FIG. 1 shows only the outline of the insulating layer 8, 7 located between the contact pads 6 and 5 and the shielding layer 9.

The semiconductor device shown in FIGS. 1, 2 and 3 is a transistor structure having an emitter zone 4, which, as may be seen from FIG. 1, comprises two portions, a base zone 3 and a collector zone 2, which in this case is the semiconductive body portions surrounding the base 3. The emitter zone 4 and the base zone 3 have smaller surface areas than the collector zone 2 and are electrically connected to the metal pads 6 and 5, respectively, intended for contact purposes. The metal layers 5 and 6 extend far over the collector zone 2 and the shielding layer 9 is interposed between the pads 5 and 6 and the collector zone 2. The surface areas of the base zone 3 and the emitter zone 4 are too small to permit lead-in wires or conductors to be connected directly thereto. For this reason, the enlarged metal layers 5 and 6 intended as contact pads are provided with projecting portions 16 and 17, respectively, which pass through apertures 18 and 19, respectively, in the oxide layer 15 and are connected directly to the base zone 3 and the emitter zone 4, respectively.

The transistor shown in FIGS. 1, 2 and 3 may be manufactured in the following manner. While the manufacture of only one device will be described, it will be understood that, as in the standard planar technology, a large number of transistor structures will usually be manufactured simultaneously in a single crystal wafer, after which the wafer is subdivided to obtain individual transistors. The starting point is an n-type, single crystal, silicon disc of approximately 250μ thick and having a resistivity of approximately 5 ohm-cm., and a transistor structure is formed in a rectangular area of about 400μ x 500μ. In a manner commonly used in the semiconductor technique, the semiconductor body 1 is covered with a silicon oxide layer 15, for example, by oxidation in wet oxygen, after which an aperture 12 is formed in the oxide layer 15 which is approximately 0.5μ thick. As is well known, apertures in such oxide layers are usually obtained in the semiconductor technique using suitable masks, photoresists and etchants. The aperture 12 has dimensions of approximately 100μ x 65μ. Next, boron oxide ($B_2O_3$) is evaporation-deposited over the oxide layer 5 and the aperture 12 for approximately 15 minutes while the semiconductor body is heated at a temperature of approximately 900° C. Next, the semiconductor body 1 is maintained at a temperature of approximately 1200° C. for approximately 20 minutes, a p-type base zone 3 of approximately 3.5μ thick being obtained by diffusion of the boron. Thereafter (or simultaneously with the formation of the base zone) the aperture 12 in the oxide layer 15 is closed again, for example, by oxidation with wet oxygen, followed by forming in the oxide a new aperture 19 having dimensions of approximately 10μ x 15μ. The semiconductor body 1 is now maintained at a temperature of approximately 1100° C. for approximately 15 minutes next to a supply of $P_2O_5$ maintained at approximately 200° C. This results in an n-type emitter zone 4 of approximately 1 to 2μ thick being obtained by diffusion of phosphorus. Again, a new aperture 18 is formed in the oxide layer 15 and at the same time the aperture 19 cleaned, after which the metal shielding layer 9 is deposited by evaporating aluminum on the whole oxide layer 15 and then removing the unwanted parts using a photoresist and an etchant so that the shielding layer 9 remains. Next, the insulating layer 7, 8 must be provided. It is possible, for example, to evaporation-deposit SiO and remove the unwanted parts with the aid of a photoresist and an etchant. It is also possible to use the photoresist itself as an insulating layer, in which event it is necessary only to provide a layer of photoresist and remove the unwanted parts in the usual manner. The assembly is now again covered with an aluminum layer by evaporation-deposition, and the unwanted parts removed so that the layers 5 and 6 intended for contact purposes remain. By heating to approximately 500° C., the projecting portions 16 and 17 in the apertures 18 and 19 may be alloyed with the semiconductor body 1 to form good connections to the emitter and base zones. Subsequently, lead-in wires or connecting conductors, for example, gold wires 13 and 14 each of approximately 25μ in diameter, are connected to the metal contact pads 5 and 6, for example, by thermocompression bonding. The connecting conductor 13 is the emitter connection and the connecting conductor 14 is the base connection. The connecting conductors 13 and 14 are shown only in FIG. 3 for the sake of clarity. Similarly, a connecting wire 10' is connected to the contact portion 10 of the shielding layer 9, which connecting conductor is only shown in FIG. 1 for the sake of clarity. If the semiconductor body 1 forms part of a larger wafer, it is cut out of the wafer and soldered to a carrier or base plate 20 of, for example, gold-coated Fernico using, for example, an indium-antimony solder 21 (approximately 2% by weight of antimony). The carrier plate 20 in this case constitutes the connecting conductor of the collector 2. It should be noted that the contact pads 5, 6 and 10, are, for example, approximately 75μ in diameter. The metal layers 5 and 6 as viewed from above (FIG. 1) terminate a few microns within the metal shield layer 9 and the latter terminates a few microns within the insulating layer 7, 8. The oxide 15 also serves the well-known protective function of the surface and of the junctions which extend to it and are covered by the oxide.

The usual encapsulation, sealed enclosure or epoxy cover (not shown) is also provided.

In the embodiment described in connection with FIGS. 1, 2 and 3, the shield is a metal layer insulated from the semiconductive wafer by an oxide which acts as a blocking layer. The isolation is necessary because the body bulk in the case described serves as the collector and is operated at a different potential than the shield.

Figure 4:
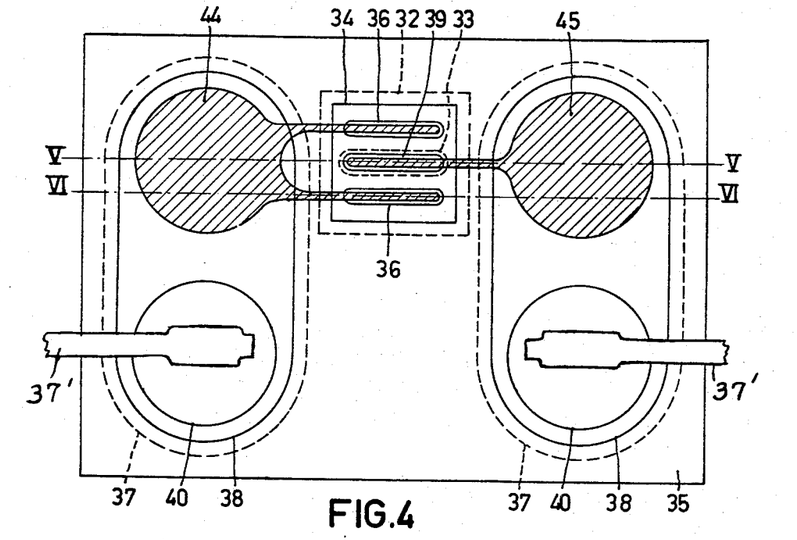
FIGS. 4, 5 and 6 are a plan view, a cross-sectional view along the line V—V, and a cross-sectional view along the line VI—VI, respectively, of another form of a transistor according to the invention using a surface-diffused shield also available externally.
Figure 5:
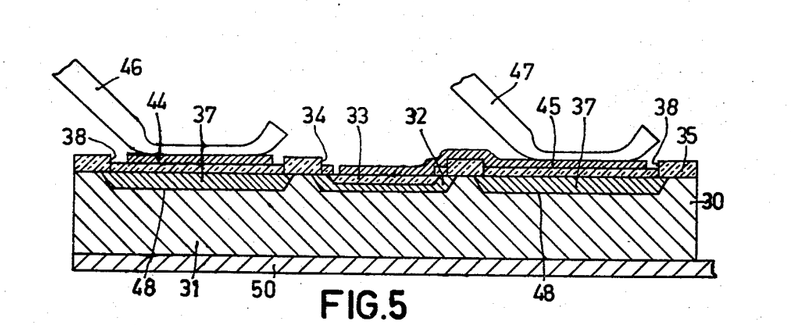
Figure 6:
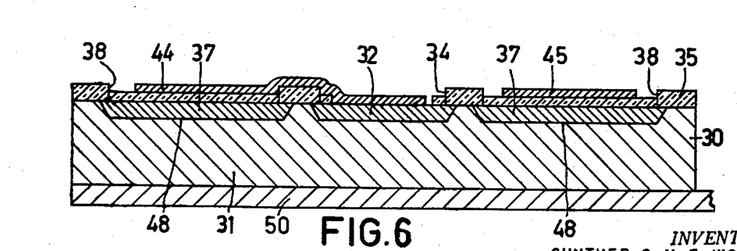

The embodiment shown in FIGS. 4, 5 and 6 has a shielding layer in the form of a surface zone of the semiconductor body with the blocking layer consisting of a p-n junction formed between the surface layer and the underlying portion of the semiconductor body. It comprises a silicon semiconductor body 30 having dimensions of approximately 500 x 400 x 250μ with an n-type collector zone 31, a p-type base zone 32, and an n-type emitter zone 33. The semiconductor body 30 is covered by a silicon oxide layer 35 having apertures 36 and 39 of approximately 10μ x 50μ through which apertures metal pads 44 and 45 are connected to the base and emitter zones 32 and 33, respectively. The substantially circular portions of the metal layers 44 and 45 have a diameter of approximately 75μ. Beneath these portions and also beneath the oxide layer 15 are p-type surface zones 37 which serve as shielding layers and which constitute p-n junctions 48 with the underlying portion of the semiconductor body 30, that is to say, the collector zone 31. Apertures 40 of approximately 75μ diameter are formed in the oxide layer 35 to permit connecting wires 37' to be connected to the shielding layers 37. A base connecting wire 46 and an emitter connecting wire 47, which are shown only in FIG. 5 for the sake of clarity, are connected, respectively, to the metal layers 44 and 45 intended for contact purposes. The transistor may be secured to a carrier plate 50 which also serves as the collector connection.

The transistor illustrated in FIGS. 4, 5 and 6 may be manufactured by the same or similar methods used for the corresponding parts of the transistor of FIGS. 1, 2 and 3. The shielding layers 37 may be provided by diffusion simultaneously with the base zone 32 during a common diffusion treatment. To this end, in addition to an aperture 34 of approximately 65μ x 65μ necessary for obtaining the base zone 32, apertures 38 of approximately 175μ x 85μ are formed in the oxide layer 35 for obtaining the diffused shielding layers 37, which apertures are closed again after the diffusion treatment, for example, by oxidation in wet oxygen. It is naturally also possible to provide the shielding layers 37 by means of a separate diffusion treatment, which may be advantageous, for example, if a comparatively high resistance base zone is provided. In this way, the conductivity of the shielding layer can be increased. In such cases, preferably the shielding layers 37 are first provided and thereafter the base zone 32 since the heat treatment used in forming the shielding layers then has no influence on the base zone 32. In the present example, separate shielding layers 37 are thus present for the metal layers 44 and 45. Supply conductors 37' which are connected to the shielding layers 37 through the apertures 40 in the oxide layers 35 are shown only in FIG. 4 for the sake of clarity. Such conductors may be provided in a manner as usually employed in the semiconductor art.

Figure 7:
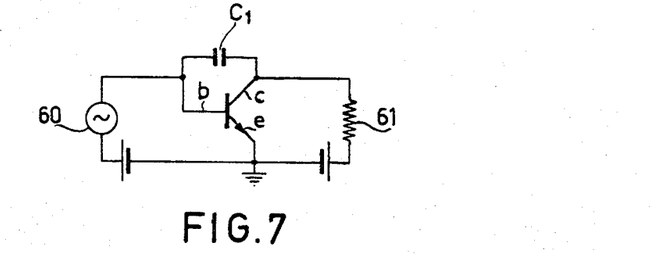
FIGS. 7 and 9 are common emitter and common base circuits, respectively, using a prior art transistor.
Figure 8:
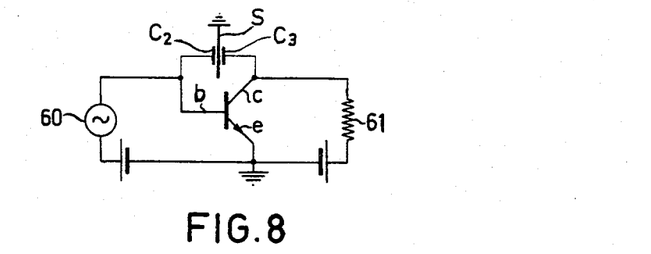
FIGS. 8 and 10 show the corresponding circuits with the transistor of the invention.

The operation of a transistor device of the invention and the improved performance obtained will now be described in connection with FIGS. 7–10. FIG. 7 illustrates a conventional n-p-n transistor in a common emitter amplifier circuit. The emitter is grounded. The signal to be amplified is supplied from a source 60 connected between the base and emitter in an input circuit which also includes the usual forward biasing means. The output circuit, connected across the collector and emitter, includes the usual reverse bias means and a load 61. As will be observed, a base-collector feedback capacitance $C_1$ is present in the circuit. This feedback capacitance mainly derives from the interelectrode capacitance formed by the large base contact pad 5 which overlies the collector 2. In a typical prior art transistor, it may amount to approximately 0.6 pf. FIG. 7 illustrates the same circuit using a transistor in accordance with the invention. The shield 9, designated S in FIG. 8, is grounded via an external connection made to its contact pad 10. As a result, the large-base-collector capacitance is effectively replaced by two smaller capacitances, an input capacitance $C_2$ between the base and ground, and an output capacitance $C_3$ between the collector and ground, which are far less troublesome. For instance, for a transistor comparable to that above, the overall base-collector capacitance is only approximately 0.15 pf., a reduction by a factor of about four. Thus, at the same frequency, an increase in amplification by a factor of four is possible, which means in multistage circuits such as an I.F. strip the elimination of one stage, which is highly advantageous.

Figure 9:
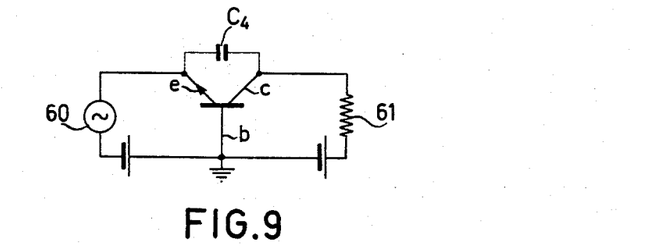
Figure 10:
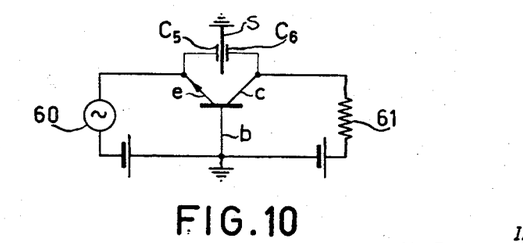

FIG. 9 illustrates a prior art common-base amplifying circuit for an n-p-n transistor, with a feedback capacitance $C_4$ as a result of the large emitter pad 6 overlying the collector 2. Again, with a transistor with the built-in shield of the invention substituted, grounded as shown in FIG. 10, the large capacitance $C_4$ is replaced by less troublesome smaller capacitances $C_5$ and $C_6$ resulting in reduced feedback capacitance. In the circuits above illustrated, the emitter and shield, or the base and the shield are shown grounded. It will be appreciated by those skilled in the art that similar results are obtained when any point of constant potential (invariant with the signal) is substituted for the ground connection shown. That is, the emitter and the shield (common-emitter) or the base and the shield (common-base) should both be connected to points (same or different) of constant potential to reduce or eliminate most completely this unwanted capacitance. However, a reduction in feedback capacitance will still be attained even when neither the shield, or the base or emitter are at a constant potential, simply by connecting them together, as is done in the embodiments to be later described. It is further pointed out that when a surface-diffused region (37 in FIG. 5) constitutes the shield and is grounded, then automatically, the p-n junction 48 is back-biased to form the required blocking layer between the shield 37 and the semiconductor 30 of opposite conductivity type. It will further be understood that both shields 37 in FIG. 4 are not required. If the transistor is to be operated in a common-emitter circuit, then only the base shield is necessary and the emitter shield may be omitted. The reverse applies for the common-base circuit.

In the embodiments described so far, the shield is provided with its own contact pad and separate connecting wire so that it may be maintained at the desired potential, for example grounded. It will further be observed that the common electrode, emitter or base, in these amplifier circuits also frequently operates at a constant potential, which may be the same potential as that applied to the shield. In the embodiments now to be described, a further improvement is obtained by providing an internal connection between the shield and the emitter (for the common-base mode) or the base (for the common-emitter mode), thereby eliminating the need for an external shield connection. The internal connection is readily made in the planar technique as a metallization or conductive deposit on the oxide in the same manner and at the same time that the contact pads are formed. When the device is intended for use in the common-emitter mode, generally not used for ultra-high frequencies but a popular circuit for the I.F. range, it is preferred that the interconnection of the shield and emitter pad extend outside of the base zone entirely over the collector. For still higher frequencies, in the UHF range, for which the common-base mode is preferred, it is preferred that the interconnection of the shield and base pad be substantially straight to form the shortest possible connection, and thus extends over the emitter zone. This helps reduce the output capacitance of the device, that is, the capacitance between the collector and the base, and between the collector and the shield. A smaller shield is therefore also desirable. In a preferred form, two parallel interconnections are provided over opposite sides of the base. An interdigital electrode structure is also preferred.

Figure 11:
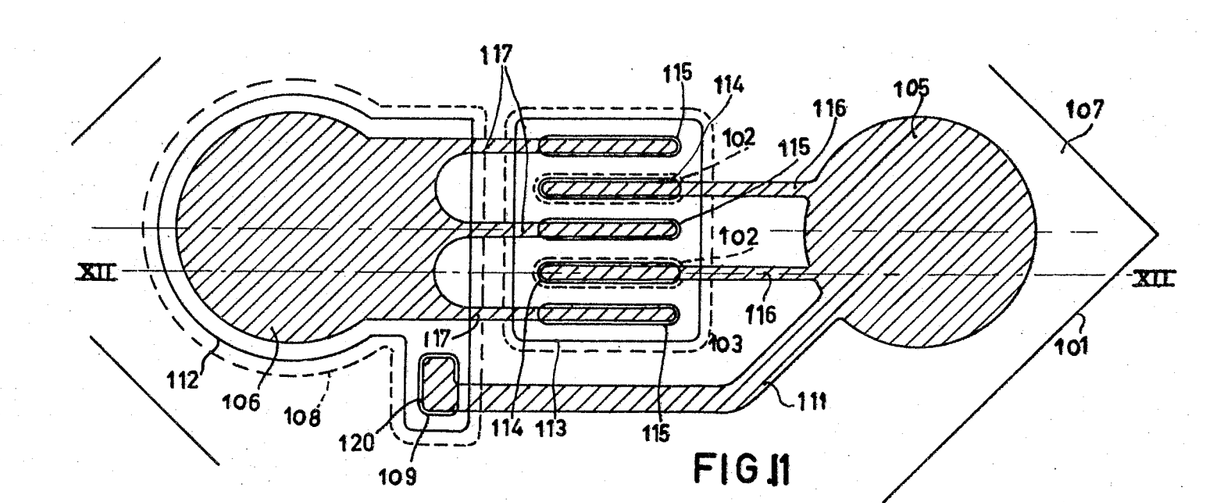
FIGS. 11 and 12 are plan and cross-sectional views (along the line XII—XII) of another transistor embodiment of the invention using a surface-diffused shield internally connected to the emitter electrode.
Figure 12:
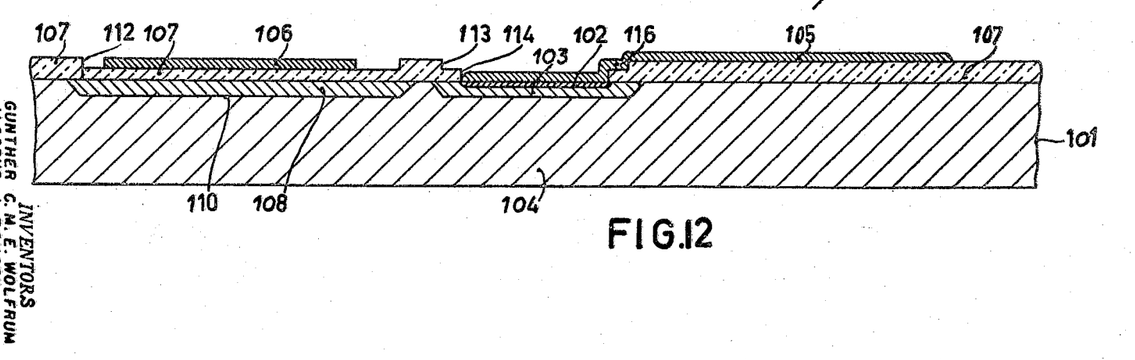

FIGS. 11 and 12 illustrate one form of the invention adapted for use in the common-emitter amplifier circuit. It comprises a semiconductor body 101 comprising a transistor structure containing an emitter region 102, a base region 103 and a collector region 104, the lateral area of the emitter region 102 and the base region 103 being smaller than that of the collector region 104. The emitter region 102 and the base region 103 are connected to metal layers 105 and 106, respectively, serving as contact pads, which are disposed on an insulating layer 107 covering the semiconductor body 101 and extend over the collector zone 104. Between one of the metal pads 105 and 106, in the present case the metal base pad 106, and the collector zone 104 is provided a shielding layer 108 which, through an aperture 109 in the insulating layer 107, has an exposed portion 120 for contacting purposes and is separated from the base pad 106 by the insulating layer 107, a barrier layer 110 being formed between the shield 108 and the underlying portion of the semiconductor body 101. In this embodiment, the other metal layer, that is to say the emitter contact pad 105, is connected by a metal strip 111 disposed on the insulating layer 107 to the exposed portion 120 of the shield 108. The metal strip 111 extends outside the base region 103 entirely across the collector region 104.

Figure 15:
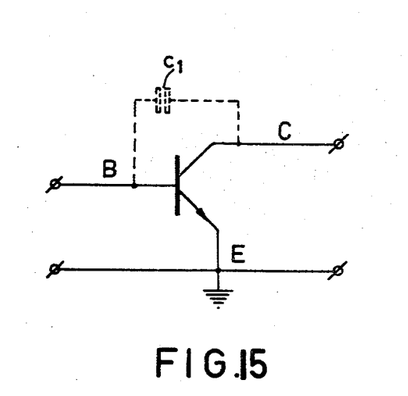
FIGS. 15 to 18, similarly to FIGS. 7 to 10, compare common-emitter and common-base circuits without and with a transistor having an internally connected shield.
Figure 16:
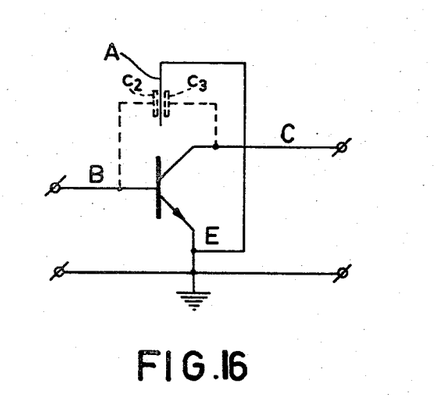

FIG. 15 shows a common-emitter circuit with a conventional transistor in which the emitter E connected to a point of constant potential, for instance ground, is common to the input circuit and the output circuit (details not shown) connected, respectively, between the emitter and base terminals and between the emitter and collector terminals. The signals to be amplified are applied to the base B and the amplified signals are derived from the collector C. Between the base pad 106 and the collector region 104 results a capacitance $c_1$ which causes feedback and consequently limits the possible amplification. FIG. 16 shows the same circuit with a transistor of the type illustrated in FIGS. 11 and 12 substituted. The shield (designated in FIG. 16 by A) is internally connected by the metal strip 111 to the emitter pad 105. Thus, the shield also is grounded, and the capacitance $c_1$ which resulted in feedback is eliminated and replaced by the capacitances $c_2$ and $c_3$, $c_2$ being prdouced between the base and ground and $c_3$ between the collector and ground. Usually the capacitances $c_2$ and $c_3$ are not troublesome, and they are especially harmless in the frequency range in which common-emitter arrangements are generally used, which extends to about 500 mc./s. It is again noted that with the shield and emitter internally connected, even if that common point is not grounded, i.e., not connected to a point of constant potential, and even for the case where no point of the circuit is at a constant potential, a reduction in feedback capacitance will result due to the replacement of the input-collector feedback capacitor by capacitors extending across the input and output circuits in a position unlikely to result in feedback.

Figure 13:
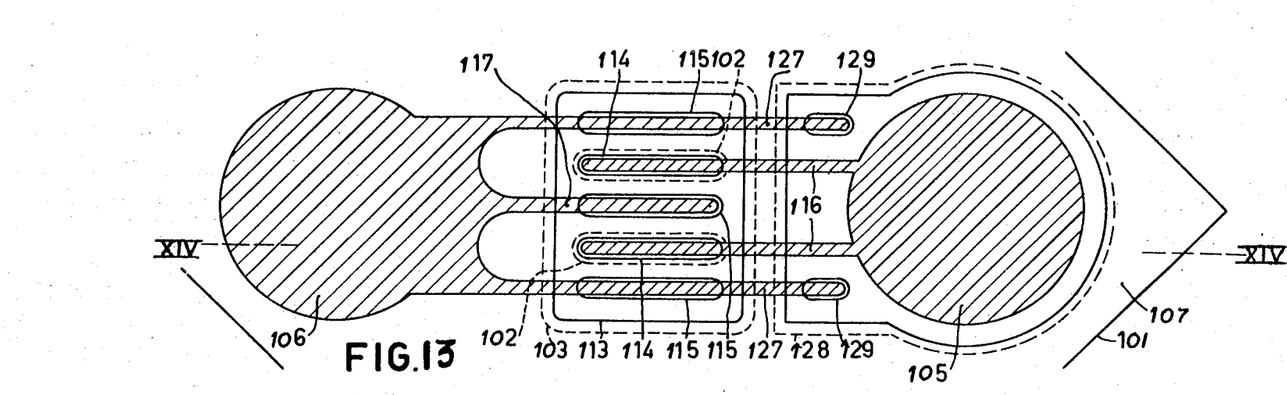
FIGS. 13 and 14 are plan and cross-sectional views (along the line XIV—XIV) of another transistor embodiment using a surface-diffused shield internally connected to the base electrode.
Figure 14:
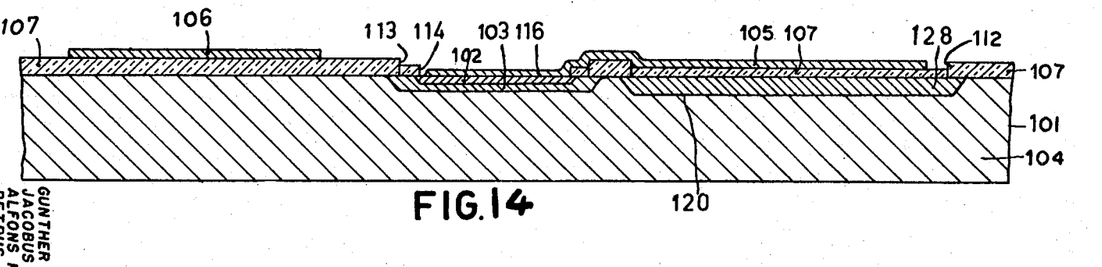

FIGS. 13 and 14 illustrate an embodiment for use in the common-base circuit and in which the metal strip which connects the shield to the base pad extends for part of its length over the region connected to the emitter pad. Parts corresponding to parts shown in FIGS. 11 and 12 are designated by like reference numerals, and may have the same sizes, be made of the same materials and by the same methods. The shield 128 is interposed between the emitter pad 105 and the collector region 104, while the base pad 106 is connected by metal strips 127 to the shield 128. The base and emitter pads 105 and 106 are located on opposite sides of the base region 103 and on the insulating layer 107. The emitter region consists of two adjacent elongated emitter partial regions 102 which are disposed in the base region 103 and correspond to elongated apertures 114 in the insulating layer 107 for contacting purposes. Elongated apertures 115 are provided in the insulating layer 107 for contacting the base region 103 between and by the sides of the apertures 114. The elongated apertures 114 and 115 extend in a direction from one metal pad 105 to the other metal pad 106, the emitter region 102 and the base region 103 each being connected to the metal pads 105 and 106, respectively, by substantially parallel strip-shaped projecting portions 116 and 117, 127, respectively, which extend into the apertures 114 and 115, respectively.

The shielding layer 128 is a surface-diffused region of the semiconductor body 101, which defines a barrier layer in the form of a p-n junction 120 with the subjacent portion of the semiconductor body 101. The base pad 106 is connected to the exposed portions of the shield 128, of about $5\mu$ by $10\mu$, which corresponds to apertures 129 made in the insulating layer 107, by the projecting portions 127 of the metal pad 106 which extend beyond the apertures 115 in the insulating layer 107, which apertures correspond to these projecting portions which, through the apertures 129, are in contact with the exposed portions of the shield 128. Thus, the projecting portions 127 connecting the base pad 106 to the base region 103 also constitute the metal strips which connect the shield 128 to the base pad 106. The metal strips 127 are substantially straight and extend for part of their length across the base region 103 connected with the base pad 106 so as to make contact with this region 103.

Figure 17:
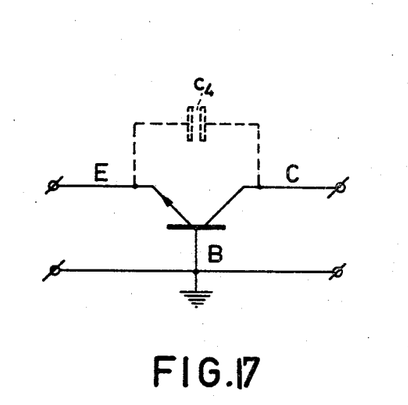
Figure 18:
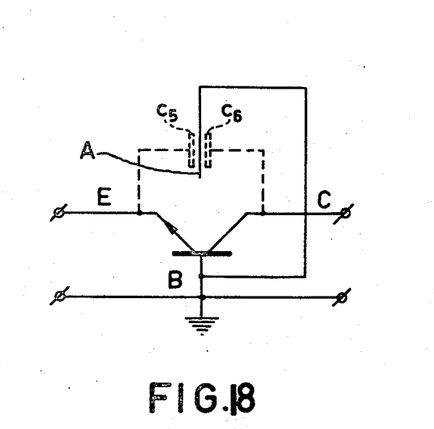

FIG. 17 shows the common-base configuration in which the base B, connected to a point of constant potential, for instance ground, is common to the input circuit and the output circuits (not shown) connected, respectively, between the base and emitter terminals and between the base and collector terminals. The signals to be amplified are applied to the emitter E and the amplified signals are taken from the collector C. With no shield present, a capacitance $c_4$ is produced between the emitter pad 105 and the collector region 104, which gives rise to feedback. With the shield 128 present (designated A in FIG. 18), which by the metal strips 27 is also grounded, the p-n junction 120 being biased in the reverse direction, the capacitance $c_4$ is eliminated and replaced by the capacitances $c_5$ and $c_6$, the capacitances $c_5$ and $c_6$ being included in the input circuit between the emitter E and ground and in the output circuit between the collector C and ground, respectively. The capacitance reduction is in general obtained when the shield is directly connected to the common electrode and is thus also common to the input and output circuits.

Common-base arrangements are generally used for amplifying signals at ultra-high frequencies, for example, frequencies higher than about 500 mc./s. In this range the capacitance $c_5$ is not troublesome, and the capacitance $c_6$ preferably is made as small as possible. The capacitance $c_6$ partly consists of the capacitance between the collector region 104 and the connections 117 and 127 of the base pad 106 to the base region 103 and the screening layer 128. Due to the combined connections 127, this part of the capacitance $c_6$ in the embodiment shown in FIGS. 13 and 14 is made small, much smaller than if a separate connection was used corresponding to the metal strip 111 of FIG. 11, which extends entirely across the collector region 104. Furthermore, by suitable dimensioning (the apertures 129 can be made small), the shield 128 in an embodiment like that shown in FIGS. 13 and 14 may be made slightly smaller than the shield 108 in an embodiment like that shown in FIGS. 11 and 12.

An example of how the devices illustrated in FIGS. 11-14 can be made follows, it again being noted that it is usual to make a large number of identical transistor structures simultaneously in a single semiconductor wafer. The starting point is a silicon wafer of n-type conductivity which is about $250\mu$ thick and has a resistivity of about 5 ohm-cm. A transistor structure is formed in rectangle portions of about 350μ by 350μ. In the usual planar manner, the semiconductor body 1 is coated with an insulating silicon oxide layer 107, for example by oxidation in wet oxygen, after which an aperture 112 is made in the oxide layer 107 which is about 0.5μ thick, following the usual photoengraving technique. The circular portion of the aperture 112 has a diameter of about 85μ. Boron oxide ($B_2O_3$) is provided in the aperture 112 by heating a supply of boron oxide together with the semiconductor body 101 in a furnace at a temperature of about 900° C. for about 20 minutes while passing over dry nitrogen. Subsequently, the semiconductor body is heated to about 1200° C. for about 20 minutes while passing over nitrogen which at 25° C. is saturated with water vapor, after which the semiconductor body is heated to about 1200° C. for about 40 minutes while passing over oxygen saturated with water vapor at 80° C. The p-type surface region 108 is obtained by diffusion of boron and the aperture 112 in the oxide layer 107 is closed again by oxidation. The p-surface 108 constitutes the shield 108 separated by a p-n junction 110 from the semiconductor n-bulk 101. Next, an aperture 113 of about 50μ by 60μ is made in the oxide layer 107. Then the p-type base region 103 is provided by a method similar to that used to provide the region 108, and the aperture 113 in the oxide layer 107 is closed again by oxidation. The base region 103 is about 3.5μ thick. The region 108 is about 4μ thick. The apertures 114 of about 5μ by 35μ each are now made in the oxide layer 107 to permit the provision of the n-type emitter partial regions 102. The emitter partial regions 102 are produced by diffusion of phosphorus, for which purpose the semiconductor body is heated to about 1100° C. for about 15 minutes in the proximity of a supply of $P_2O_5$ maintained at about 200° C. Thus, diffusion of phosphorus produces n-type emitter partial zones 102 which are from 1 to 2μ thick. The apertures 115 of about 5μ by 35μ each are now made for making contact to the base region 103, while at the same time the apertures 114 are cleaned. Furthermore, the aperture 109 of about 10μ by 20μ is made in the oxide layer 7 so as to provide the exposed portion 120 of the shield for contacting. Subsequently, an aluminum layer about 4000 A. thick is deposited on the oxide layer 107 from the vapor phase. By means of a photoresist and an etching agent the aluminum layer is partially removed so that the metal pads 105 and 106 and the substantially parallel strip-shaped projecting portions 116 and 117 which extend into the apertures 114 and 115, are obtained together with the metal strip 111 which is about 15μ wide. By heating the assembly to about 500° C., the aluminum in the apertures 109, 114 and 115 is alloyed to the semiconductor body 101.

Emitter and base leads can be connected to the metal pads 105 and 106, respectively, by methods commonly used in semiconductor technology. Furthermore, the collector region 104 can be soldered to a metal support adapted to serve as a collector lead by a method commonly used in semiconductor technology. The assembly may then be encapsulated by a known method.

The resulting transistor as shown in FIGS. 11 and 12 when connected in a common-emitter circuit as shown in FIG. 16 is found to have a feedback capacitance of only about 0.15 pf., in comparison with a value of 0.45 pf. for a comparable transistor made without the shield. Thus, the internal shield reduces the capacitance giving rise to feedback by a factor of about 3, so that the possible amplification is increased by a factor of about 3. Hence, the shield provides an important improvement and furthermore the provision of the internal connection 111 enables the transistor to be connected in a common-emitter arrangement without an additional lead for the shield being required. It is noted that the p-n junction 110 between the shield 108 and the collector zone 104 is biased in the reverse direction in the common-emitter circuit shown in FIG. 16.

Obviously, the invention is not restricted to the embodiments described and a person skilled in the art may make many modifications without departing from the scope of the invention. Thus, the semiconductor body may consist of other well-known semiconductive materials, for example, germanium or an $A_{III}$-$B_V$ compound. In addition, in the embodiment shown in FIGS. 13 and 14, the shield 128 may be connected to the base pad 106 by a single metal strip 127, the other metal strip 127, just like the strip 117, connecting the metal layer 106 to the base region 103 only. The strip 117 may also be extended and similarly to the strips 127 be connected to the shield 128 through an aperture in the oxide layer 107. The metal deposits on the insulating layer may be of metal other than aluminum, e.g., nickel. Other well-known insulators, such as boron or silicon nitride, may be substituted for the silicon oxide. While the most important improvement is obtained in transistors, especially of the planar type, the invention is also applicable to diodes or more complex semiconductor devices (solid or integrated circuits) which employ metal contact layers on an insulator, for example, to constitute an electrical connection between active semiconductor switching elements, which give rise to the problem described above.

While we have described our invention in connection with specific embodiments and applications, other modifications thereof will be readily apparent to those skilled in this art without departing from the spirit and scope of the invention as defined in the appended claims.

What is claimed is:

1. A planar semiconductor device comprising a body constituted of a semiconductive portion having a major surface, plural semiconductive zones having different electrical properties within said body portion and located adjacent said major surface and extending to said major surface, an insulating layer covering said major surface and having at least one opening over one of said semiconductive zones, said plural semiconductive zones forming at least one junction extending to said major surface underneath said insulating layer, a conductive layer on said insulating layer and extending through the said opening into contact with said one semiconductive zone for receiving a connection for the latter, said contact layer overlying another of said semiconductive zones and forming therewith a capacitance; and means for reducing the said capacitance, said capacitance reducing means comprising a conductive shield member in the body and extending between the said contact layer and the said other semiconductive zone and insulated from the contact layer, blocking layer means between the shield member and the underlying region of the semiconductive body portion, and an electrical connection to the shield member and accessible externally of the device for connecting said shield member to a point of common potential.

2. A device as set forth in claim 1 wherein the shield member is a layer of metal underlying and insulated from the contact layer, and the blocking layer is an insulating coating on the semiconductive body portion underneath the metal layer.

3. A device as set forth in claim 1 wherein a second contact layer is provided on the insulating layer and overlying a semiconductive zone and connected to a different semiconductive zone, and a common conductive shield member is provided between both contact layers and the blocking layer means.

4. A planar transistor comprising a body constituted of a semiconductive portion having a major surface, emitter, base and collector semiconductive zones with adjacent zones exhibiting opposite conductivity types within said body portion and located adjacent said major surface and extending to said major surface, an insulating layer covering said major surface and having at least one opening over the emitter zone and another opening over the base zone, said semiconductive zones forming emitter and collector junctions extending to said major surface underneath said insulating layer, at least one conductive layer on said insulating layer and extending through one of said openings into contact with one of said emitter and base semiconductive zones for receiving a connection for the latter, said contact layer to said one zone having lateral dimensions larger than that of the semiconductor zone contacted but substantially smaller than that of the semiconductive body portion, said contact layer overlying the collector semiconductive zone and forming therewith a capacitance; and means for reducing the said capacitance, said capacitance reducing means comprising a conductive shield member in the body and extending between the said one contact layer and the collector zone and insulated from the said one contact layer, blocking layer means between the shield member and the underlying region of the semiconductive body portion, and an electrical connection to the shield member and accessible externally of the transistor for connecting said shield member to a point of common potential.

5. A transistor as set forth in claim 4 wherein the shield member comprises a surface region of the semiconductive body portion within the collector zone and of the opposite conductivity type forming with the collector zone a p-n junction constituting the blocking layer.

6. An amplifier circuit comprising a transistor as claimed in claim 4 and further including an input circuit with means for applying a signal to the said one of the emitter and base zones, an output circuit with means for deriving a signal from the collector zone, the other of the emitter and base zones being common to the input and output circuits, means for connecting said other of the emitter and base zones to a point of common potential, and means for connecting the shield member to a point of common potential.

7. A planar transistor comprising a semiconductive body having a major surface, emitter, base and collector semiconductive zones with adjacent zones exhibiting opposite conductivity types within said body and located adjacent said major surface and extending to said major surface, an insulating layer covering said major surface and having at least one opening over the emitter zone and another opening over the base zone, said semiconductive zones forming emitter and collector junctions extending to said major surface underneath said insulating layer, a first conductive layer on said insulating layer and extending through the said one opening into contact with said emitter semiconductive zone for receiving a connection for the latter, a second conductive layer spaced from said first and also on said insulating layer and extending through the said other opening into contact with said base zone for receiving a connection for the latter, each of said contact layers having lateral dimensions larger than that of the semiconductive zone contacted but substantially smaller than that of the semiconductive body, each of said contact layers overlying the collector semiconductive zone and forming therewith a capacitance; and means for reducing the said capacitance, said capacitance reducing means comprising a conductive shield member comprising a surface region of the semiconductive body within the collector zone and extending underneath substantially the whole of at least one of the said contact layers with the insulating layer between it and the said one contact layer, said surface region shield member being of a conductivity type opposite to that of the collector zone and forming with it a p-n junction constituting a blocking layer, an electrical connection to the surface region shield member and accessible externally of the transistor, means for connecting the other of said contact layers to a point of potential, and means for connecting said shield member to the same point of potential.

8. A device as set forth in claim 7 wherein the said one contact layer is connected to the base zone, the last-named connecting means and the contact layers are metallizations on the insulating layer, and the metallization constituting the connecting means to the shield member extends wholly over the collector zone outside of the base zone.

9. A device as set forth in claim 7 wherein the last-named connecting means and the contact layers are metallizations on the insulating layer, and the metallization constituting the connecting means to the shield member extends partly over the base semiconductive zone.

10. A device as set forth in claim 9 wherein the metallization constituting the connecting means is substantially straight.

11. A device as set forth in claim 10 wherein the said one contact layer is connected to the emitter zone, the base and emitter contact layers are arranged on opposite sides of the base zone, the connections from the contact layers to their connected semiconductive zone are made through openings in the insulating layer which are elongated in the direction from one contact layer to the other contact layer, said metallizations forming substantially parallel strips, and the metallization connecting the shield member to the other contact layer is an extension in the same direction of the strip metallization connecting said other contact layer to its connected semiconductive zone through one of the elongated openings.

12. An amplifier circuit comprising a transistor as claimed in claim 7 and including an input circuit connected between the emitter and base contacts with means for applying a signal to the said one of the contact layers, and an output circuit connected between the other of the contact layers and the collector zone with means for deriving a signal from the collector zone, said shield member being connected to the same circuit point as said other contact layer.

13. An amplifier circuit as set forth in claim 6 wherein the means connecting the other zone and the means connecting the shield member are both connected to the same potential point.

14. A transistor as set forth in claim 7 wherein the point of potential is a point of constant potential.

15. A transistor as set forth in claim 7 wherein the insulating layer covering the major surface has another opening over a portion of the surface region shield member, and a conductor extends through the last-named opening into contact with said shield member to constitute the electrical connection thereto.

References Cited

UNITED STATES PATENTS

| | | | |
|---|---|---|---|
| 3,271,201 | 9/1966 | Pomerantz | 148—33 |
| 3,257,588 | 6/1966 | Muller | 317—234 |
| 3,271,685 | 9/1966 | Husher | 325—440 |

JOHN W. HUCKERT, *Primary Examiner.*

M. EDLOW, *Assistant Examiner.*